US007221506B1

(12) United States Patent
Schlosser (10) Patent No.: US 7,221,506 B1
(45) Date of Patent: May 22, 2007

(54) METHOD AND SYSTEM FOR PROJECTING AUDIO AND VIDEO IN AN OUTDOOR THEATER

(76) Inventor: Andrew J. Schlosser, 907 W. 5th St., Austin, TX (US) 78703

( * ) Notice: Subject to any disclaimer, the term of this patent is extended or adjusted under 35 U.S.C. 154(b) by 280 days.

(21) Appl. No.: 10/981,419

(22) Filed: Nov. 4, 2004

Related U.S. Application Data (60) Provisional application No. 60/517,260, filed on Nov. 4, 2003.

(51) Int. Cl.
G03B 21/56 (2006.01)
G03B 21/00 (2006.01)
G02B 7/00 (2006.01)
E06B 9/00 (2006.01)

(52) U.S. Cl. .............. 359/449; 359/446; 359/896; 359/900; 160/219; 160/220; 160/353; 353/121

(58) Field of Classification Search ............... 359/449, 359/443, 446, 459, 896, 900; 160/219, 220, 160/236, 353; 52/65, 750; 353/121–122
See application file for complete search history.

(56) References Cited

U.S. PATENT DOCUMENTS 1,909,537 A   5/1933   Hollingshead
3,502,402 A * 3/1970   Markson ................. 352/69
4,095,882 A * 6/1978   Karamon ................. 353/122
4,555,167 A   11/1985  Roland
4,962,420 A * 10/1990  Judenich ................. 348/744
5,890,323 A   4/1999   Errato
6,020,890 A * 2/2000   Kohda ................... 345/419
6,407,798 B2  6/2002   Graves

FOREIGN PATENT DOCUMENTS

WO      WO 85/00669      2/1985

* cited by examiner

Primary Examiner—W. B. Perkey
Assistant Examiner—Magda Cruz
(74) Attorney, Agent, or Firm—William D. Wiese; DuBois, Bryant, Campbell & Schwartz LLP (57) ABSTRACT

Images are projected onto two adjacent screens whereby one screen is movable with respect to the second screen. A projection system disposed generally in front of the two screens is capable of displaying images on each screen independently when the two screen are in an "open" position or on both screens together when the two screens are configured in a "closed" position. In a first "open" configuration, the images viewable on one screen are not viewable to the viewers of images on an adjacent screen and, in a second "closed" configuration, images are displayed on both screens together so as to be viewable by all members of the audience. In addition, a berm is configured between the viewing area of one screen and the viewing area of the other screen to create an audio and visual barrier between the two screens.

2 Claims, 10 Drawing Sheets

METHOD AND SYSTEM FOR PROJECTING AUDIO AND VIDEO IN AN OUTDOOR THEATER

PRIORITY STATEMENT UNDER 35 U.S.C. § 119 & 37 C.F.R. § 1.78

This non-provisional application claims priority based upon prior U.S. Provisional Patent Application Ser. No. 60/517,260 filed Nov. 4, 2003 in the name of Andrew J. Schlosser, entitled "System for Viewing Movies in Outdoor Amphitheater," the entire disclosure of which is incorporated herein by reference.

TECHNICAL FIELD OF THE INVENTION

The present invention relates to an design for an open air cinema. More particularly, the invention relates to an improved method and system for projecting images on adjacent screens in an open air theater and for attenuating sound therebetween.

BACKGROUND OF THE INVENTION

Today, most film-projectors incorporated in movie theatre auditoriums utilize lamps that output approximately 15,000 lumens of light. Lamps that output in excess of approximately 15,000 lumens of light cause 'celluloid' film to disintegrate and melt because of the heat buildup associated with illuminating film. Because of the relatively low level of light output from old-fashioned film projectors; there is a natural limit to the size of the screen onto which filmed content may be projected without becoming so dim as to become undecipherable.

Newer generation digital projectors are now available that are capable of generating approximate 25,000 lumens of light. Three of these projectors can be stacked on top of one-another or can be placed side-by-side (all projecting precisely the exact digital image) to attain up to approximately 75,000 lumens of light. These projectors are very well suited for the exhibition of blockbuster movies, television and CATV content, and immersive advertising either 'live' or from pre-recorded mediums onto large screens. However, because of the economic constraints of constructing large, column-free, free-span, air-conditioned envelopes around such large screens, there are no indoor auditoria in the United States capable of accommodating such screens. It is possible, however, to project images on such a large screen without sustaining the economic burden of constructing large, column-free, free-span, air-conditioned envelopes by projecting the images in an outdoor, open-air theater.

SUMMARY OF THE INVENTION

The present invention provides an improved method and system for projecting images in an open-air cinema. The images are projected onto two adjacent screens whereby one screen is movable with respect to the second screen. A projection system disposed generally in front of the two screens is capable of displaying images on each screen independently or on both screens together. More specifically, in a first configuration, the images viewable on one screen are not viewable to the people viewing images on an adjacent screen and, in a second configuration, images are displayed on both screens together so as to be viewable by all members of the audience.

In addition, the present invention provides an improved method of blocking visual access and attenuating sound between a first viewing area and an adjacent second viewing area. A berm is configured between the first viewing area and the second viewing area so as to provide a barrier to sound bleeding from one viewing area onto the other viewing area. The berm is also configured to prevent viewers in one seating area from viewing images on a screen intended for viewers in a second viewing area. Additionally, the top of the berm is configured to provide a third viewing area from where a single image may be seen when the screens are in the second configuration.

This invention, together with the additional features and advantages thereof will become more apparent to those of skill in the art upon reading the description of the preferred embodiments, with reference to the following drawings.

DESCRIPTION OF THE DRAWINGS

A better understanding of the system and method of the present invention may be had by reference to the drawing figures, wherein.

DESCRIPTION OF THE PREFERRED EMBODIMENTS

The present invention is an improved method and system for displaying audio and video in an outdoor theater. It should be appreciated that the present invention is equally applicable to any appropriate audio or video feed and that the audio and video may be projected locally, including from a pre-recorded medium, or from remote feeds. In addition to displaying video content, the present invention may be used to project or exhibit live or pre-recorded video content or disseminating live or pre-recorded audio content. In addition, the audio and video equipment of the present invention may stand alone or may be networked with other audio-visual equipment, thereby providing the ability to produce a "live" feed for the broadcast of real-time events.

Figure 1:
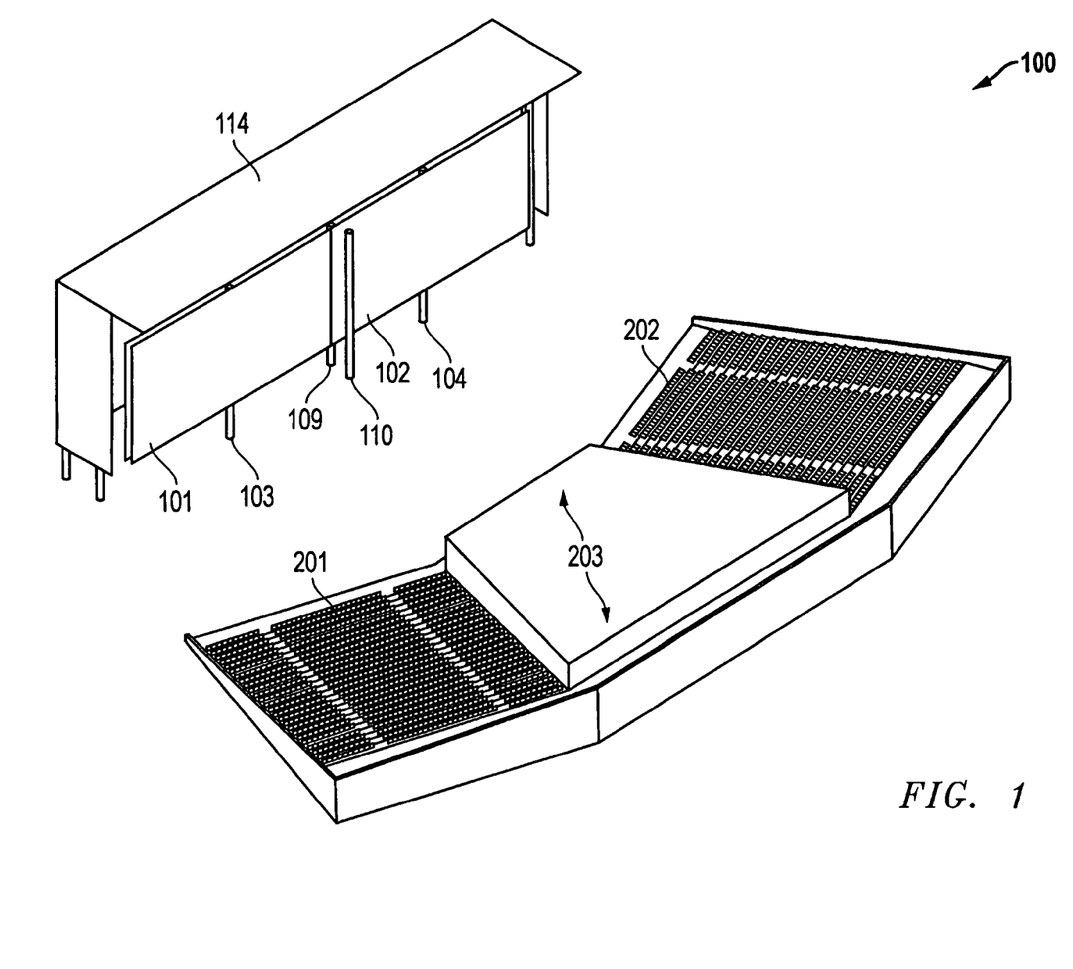
FIG. 1 is a rear perspective view of the adjacent screens in a single "closed" configuration and the viewing areas of the present invention together.

Referring now to the various figures of the drawing wherein like reference characters refer to like parts throughout the several views. FIG. 1 shows a theater 100 with a first screen 101, a second screen 102, and a berm 203 of the present invention. An audience may be positioned in the first viewing area 201 directly across from the first screen 101, an audience may be positioned in the second viewing area 202 directly across from the second screen 102, and, optionally, an audience may be positioned atop the berm 203, all in an open-air plaza/amphitheater type complex. The back of the viewing area may be constructed at a higher elevation than the front, thereby providing all viewers with unobstructed visual access to the screens. The berm 203 can be made of earth or some other material to provide viewing area when the screens are in the "closed" position of FIG. 1 and also serve as a visual and sound barrier between the first viewing area 201 and the second viewing area 202 when the screens are in the "open" position described later. Such a berm 203 will also be attractive for park-type use.

In one embodiment of the invention, high-frequency sound may be delivered in a directed-manner from an area between the screen and the front row of each of the first viewing area 201 and the second viewing area 202. Alternatively, high-frequency sound may be directed toward the applicable viewing area from speakers that are embedded near the base of each side of the berm 203. Low-frequency sound could be delivered from amplifiers that are imbedded near the base of each side of the berm 203. In addition to or in lieu of other sound delivery methods, sound might be delivered wirelessly, such as through ordinary radio bandwidth, to antenna-posts situated throughout each viewing area. In such case, the antenna-posts would broadcast a very feint signal, decipherable only to viewers that have paid admission and that have brought their own radios. In addition to or in lieu of other sound delivery methods, sound may be delivered via wire or cable to amplifier-posts situated throughout each viewing area. In such case, the amplifier-posts would disseminate an audible signal, decipherable only to viewers that are situated within a short distance of each amplifier-post in an applicable viewing area; the amplifier-posts could be configured with earphone-jacks.

The theater 100 has one or more projectors that projects images on the first screen 101 and the second screen 102. In one embodiment of the present invention, one or more projectors can project approximately 2000 pixel×1000 pixel images on a first screen 101 and project separate and discrete 2000 pixel×1000 pixel images (approximately) on a second screen 102. Alternatively, one or more projectors can project two 2000×1000 pixel images that are seemed together and are in perfect sequence to appear as one unified image of approximately 4000 pixels×1000 pixels at an approximate 4:1 aspect ratio on one elongated screen. In yet another alternative, one or more projectors can project one separate right-eye image and one left-eye image onto a single screen that would be perfectly sequenced and appear as monolithic 'three-dimensioned' content. Images from multiple vantage points captured by multiple cameras can be mixed and formatted so that that projected output from one or more is collaged on a single screen.

Figure 2:
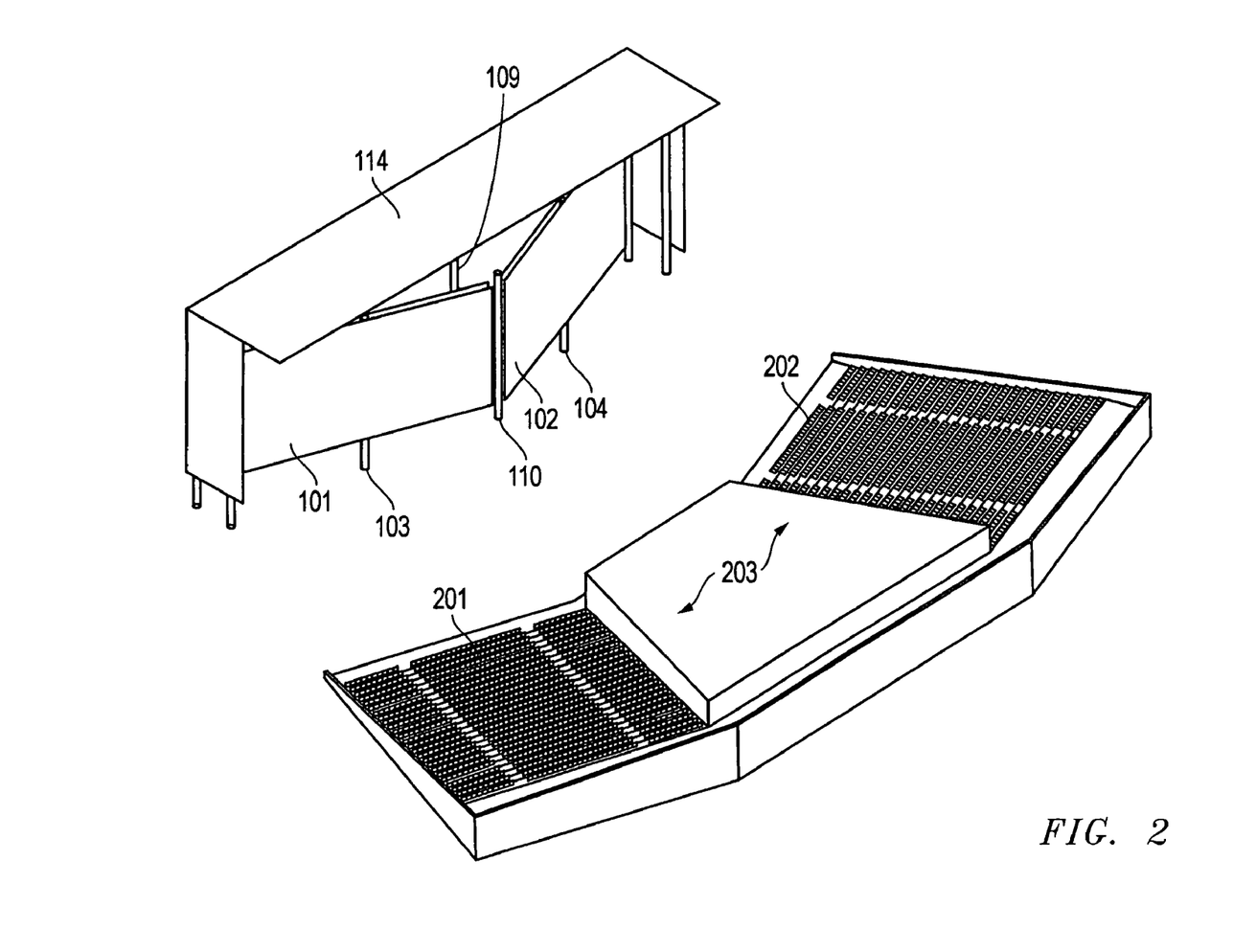
FIG. 2 is a rear perspective view of the adjacent screens in an "open" configuration and the viewing areas of the present invention together.

FIG. 2 shows the theater 100 with the same adjacent screens 101 and 102 and berm 203 of the present invention. In this configuration, the first screen 101 and the second screen 102 are shown in a split configuration wherein the first screen 101 is angled toward the first seating area 201 and the second screen 102 is angled toward the second viewing area 202. In this configuration, one set of images may be projected onto the first screen 101 and a different set of images may be projected onto the second screen 102. Viewers sitting in the first viewing area 201 can view the images projected onto the first screen 201 and viewers sitting in the second viewing area 202 can view the images projected onto the second screen 102. Because of the angle of the two screens 101 and 102, viewers in the first viewing area 201 are not able to view the images projected onto the second screen 102 and viewers in the second viewing area 202 are not able to view the images projected onto the first screen 101. Moreover, the berm 203 between the first viewing area 201 and the second viewing area 202 also serves as an audio and visual barrier between the viewers in the first viewing area 201 and the second screen 102 and between the viewers in the second viewing area 202 and the first screen 101.

In order to provide high-quality images having minimal distortion, screens 101 and 102 may be designed with a width and arcuate radius suitable for conventional film sizes. Alternatively, the screens may be partially or completely flat. The screens of the present invention can have different surface characteristics, including a lenticular surface, all to enhance the quality of the image perceived. In FIG. 1, the first screen 101 and the second screen 102 are shown in a single "closed" configuration. In this configuration, images can be projected on the first screen 101 and the second screen 102 at the same time so as to be visible to viewers seated in a first seating area 201, a second seating area 202, or on top of the berm 203.

Figure 3:
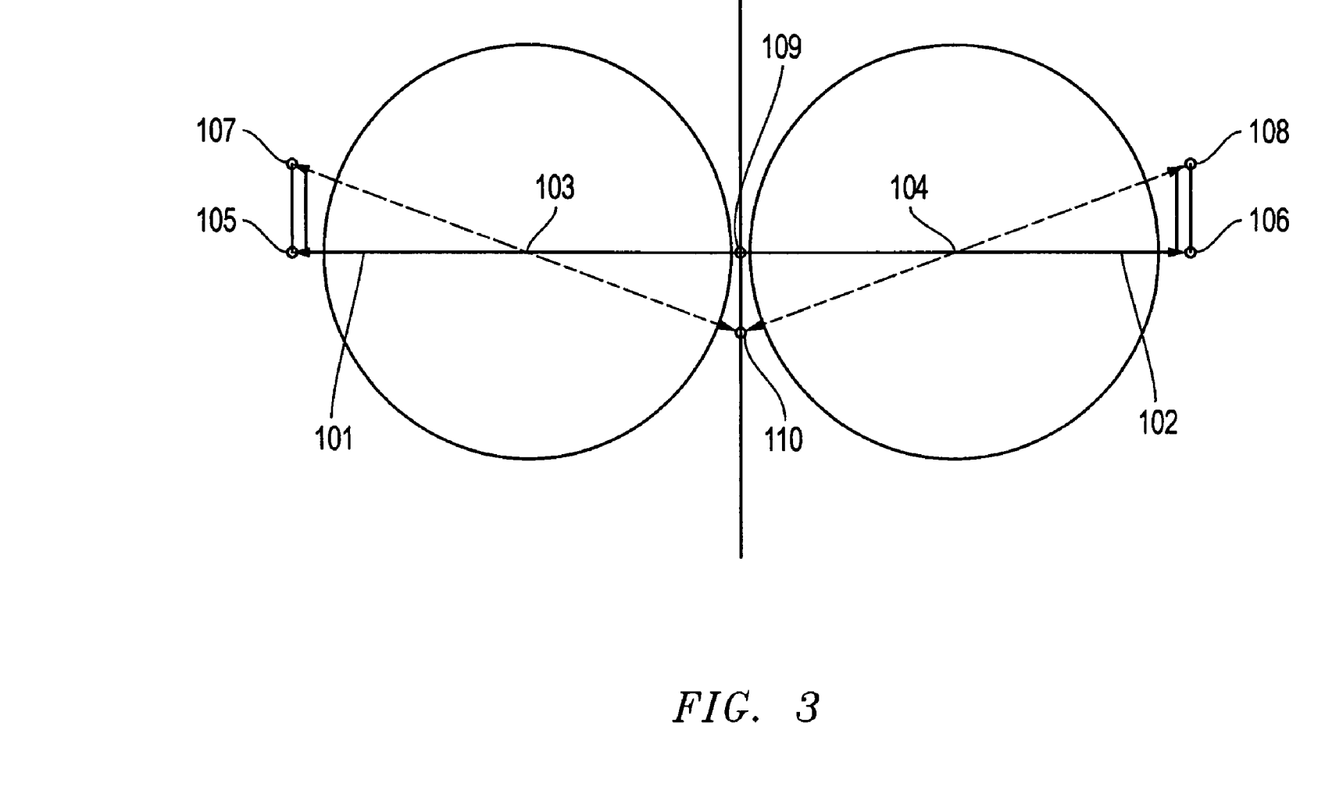
FIG. 3 is a plan view of the adjacent screens of the present invention in a single "closed" configuration.

FIG. 3 shows a plan view of the adjacent screens of the present invention in a single configuration. The screens are arranged so that the they are aligned with one another at the center point 109 between the first screen 101 and the second screen 102. The alignment of the two screens creates a large monolithic viewing area. To illustrate an embodiment of the invention, each screen 101 and 102 could be approximately 100 feet wide by 50 foot high. The base of each screen 101 and 102 could be approximately 20 feet above the first seating area 201 and the second seating area 202 which would result in the top of the screen being approximately 70 feet high. In another embodiment of the invention, each screen 101 and 102 could be only 80 feet wide by 40 feet high to accommodate a 2:1 aspect ratio projection. In yet another embodiment of the invention, the viewing area of the first screen 101 and the second screen 102 together may be approximately 1000 pixels high by 4000 pixels wide with an aspect ratio of approximately 4:1. These dimensions are designed to take into account the formats of the films being shown by the theater as well as the dimensions of the theater itself and the physical location of the projection components, such as the projectors and the screens, however the dimensions are not meant to be limiting and may be any dimensions selected by the user of the invention.

The first screen 101 and the second screen 102 may be constructed in any manner known in the art. For example, each screen may be mounted on and stretched across a frame to form a rectangular, substantially-planar screen. The screen material itself may be made of any conventional pliant material having a reflective coating and a light and opaque color. The screen material can be perforated with small holes (not shown) to allow air to pass through the screen or to allow sound from speakers positioned behind the screen to radiate outwardly from the screen towards the viewing area. Alternatively, it is to be appreciated that one or more of the screens can be made of a non-pliant screen surface material, such as wood, instead of a flexible material that can be rolled and unrolled or ballooned. In other alternative embodiments, a screen can use a combination of pliant and non-pliant materials.

The screen could be affixed in their relative position by any means available. In one embodiment of the invention, the first screen 101 is affixed in its position by chaining or cabling the screen to side posts 105 and center post 109 when the screens are in the "closed" position and side post 107 and center post 110 when the screens are in the "open" position. The second screen is affixed in its position by chaining or cabling the screen to side posts 106 and center post 109 the screens are in the "closed" position and side post 108 and center post 110 when the screens are in the "open" position. Each screen 101 and 102 is configured to pivot so that the screens can be moved from the singular configuration shown in FIG. 1 to a configuration whereby each screen 101 and 102 faces its respective seating area 201 and 202 such as that shown in FIG. 2. In one embodiment, each screen 101 and 102 is configured with a center pole 103 and 104 and each screen is moved by manually or automatically rotating the screen around its center pole. Other embodiments are also contemplated such as mounting each screen 101 and 102 on wheels on a track and rotating the screens by rolling them on the track, or suspending each screen from top and bottom wires, cables or chains and rotating the screens by moving the wires, cables or chains as necessary. In another embodiment, the movement may occur by moving the left edge of the bottom-most beam of the first screen 101 along an intersecting beam connecting side posts 105 and 107 and the right edge of the bottom-most beam of the first screen 101 along an intersecting beam connecting center posts 109 and 110. Similarly, movement of the second screen 102 may occur by moving the left edge of the bottom-most beam of the second screen 102 along an intersecting beam connecting center posts 109 and 110 and the right edge of the bottom-most beam of the second screen 102 along an intersecting beam connecting center posts 106 and 108. Additionally, although each center pole is fixed in the embodiment shown in the FIGS. 1 through 10, it is also to be appreciated that both the first screen 101 and the second screen 102 can be mounted on wheeled platforms or tracks such that all sections of both screens are mobile and movable relative to each other.

Figure 4:
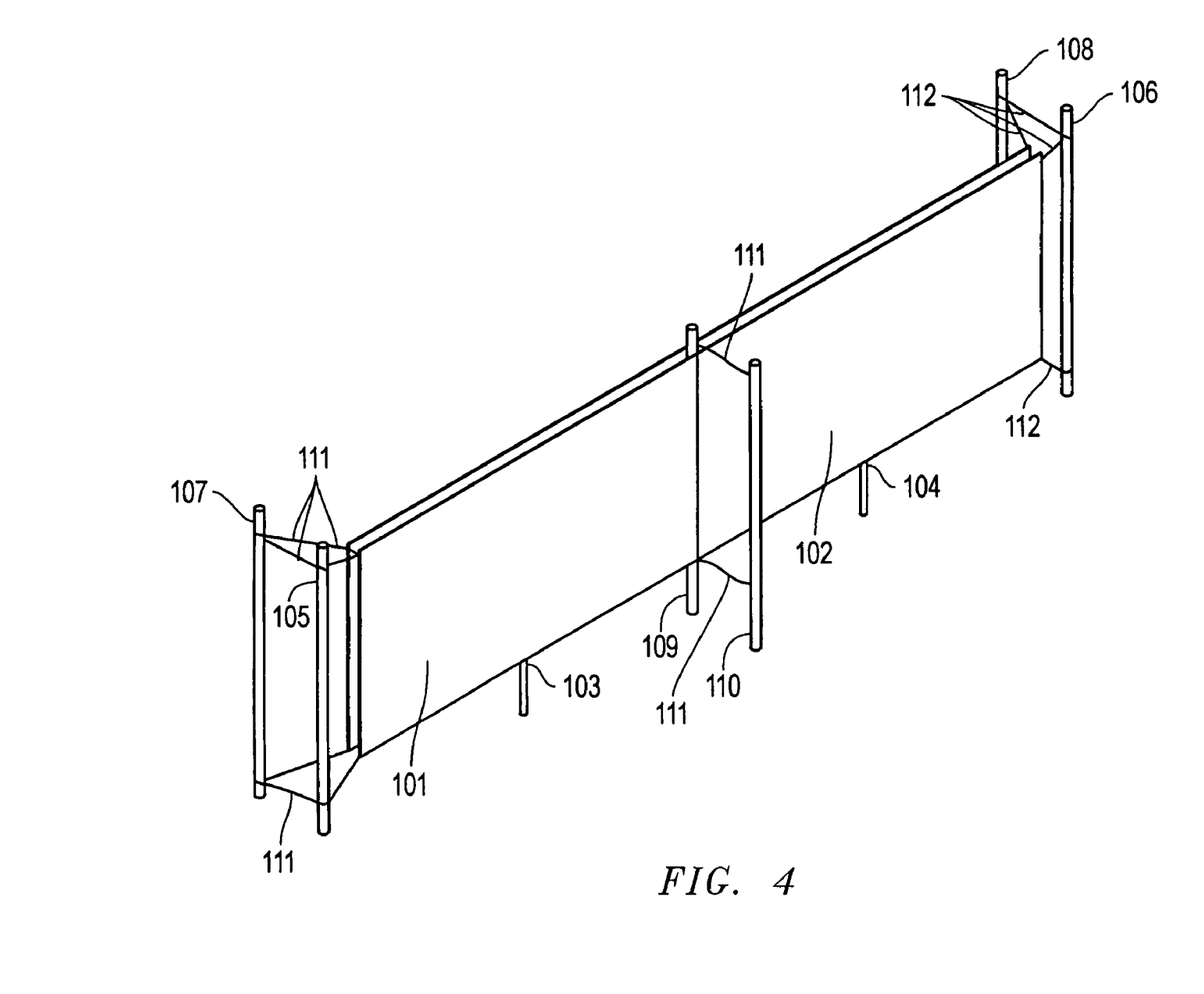
FIG. 4 is a perspective view of the adjacent screens of the present invention in a single "closed" configuration.

As can be seen in FIG. 4, the first screen 101 and the second screen 102 are abutting one another so that the resulting screen appears as a single viewing surface. In alternate embodiments of the invention, a space or gap may exist between the first screen 101 and the second screen 102.

Figure 5:
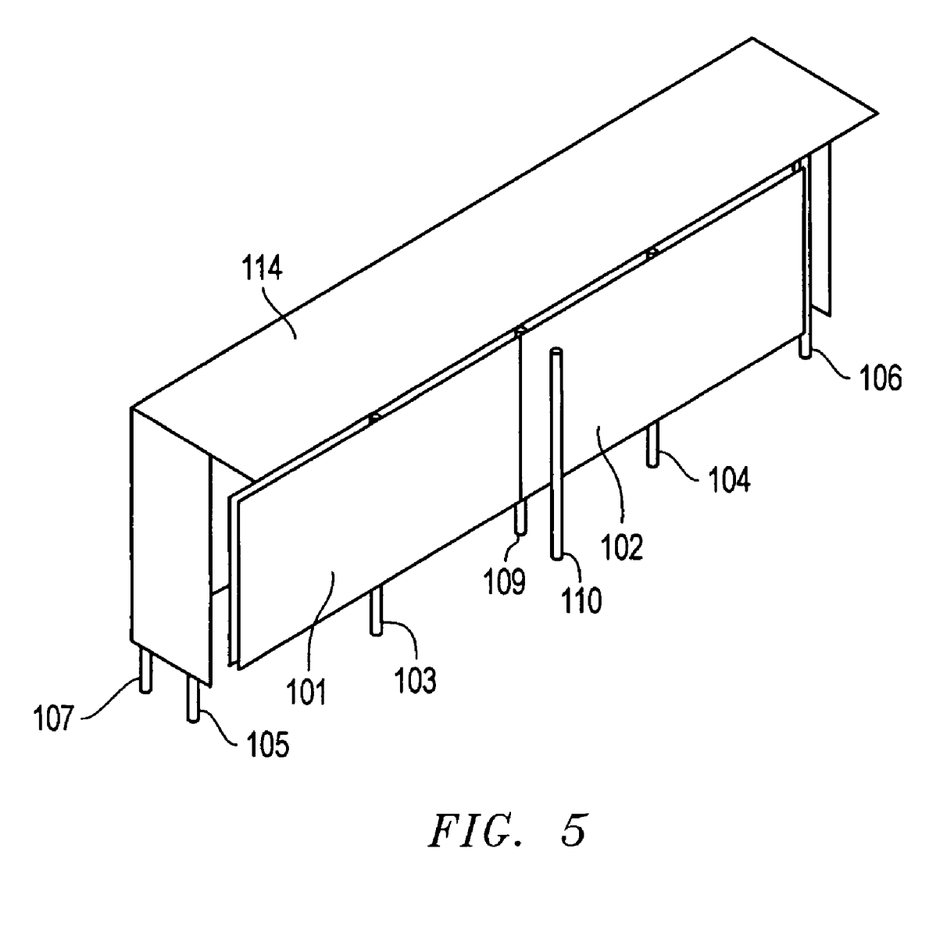
FIG. 5 is a perspective view of the adjacent screens of the present invention in a single "closed" configuration located within a weather-protecting shelter.

FIG. 5 shows a another view if the screens of the present invention in their unitary "closed" configuration. In this embodiment, a shelter 114 is configured to protect the first screen 101 and the second screen 102 from the wind, rain, light and other elements or environments which may be detrimental thereto. The shelter 114 can be constructed using the side posts 105, 106, 107 and 108 as supporting members for the walls, back and ceiling. The ceiling is extended outwardly from the sides so as to attenuate the effects of the late-afternoon or dusk light.

Figure 6:
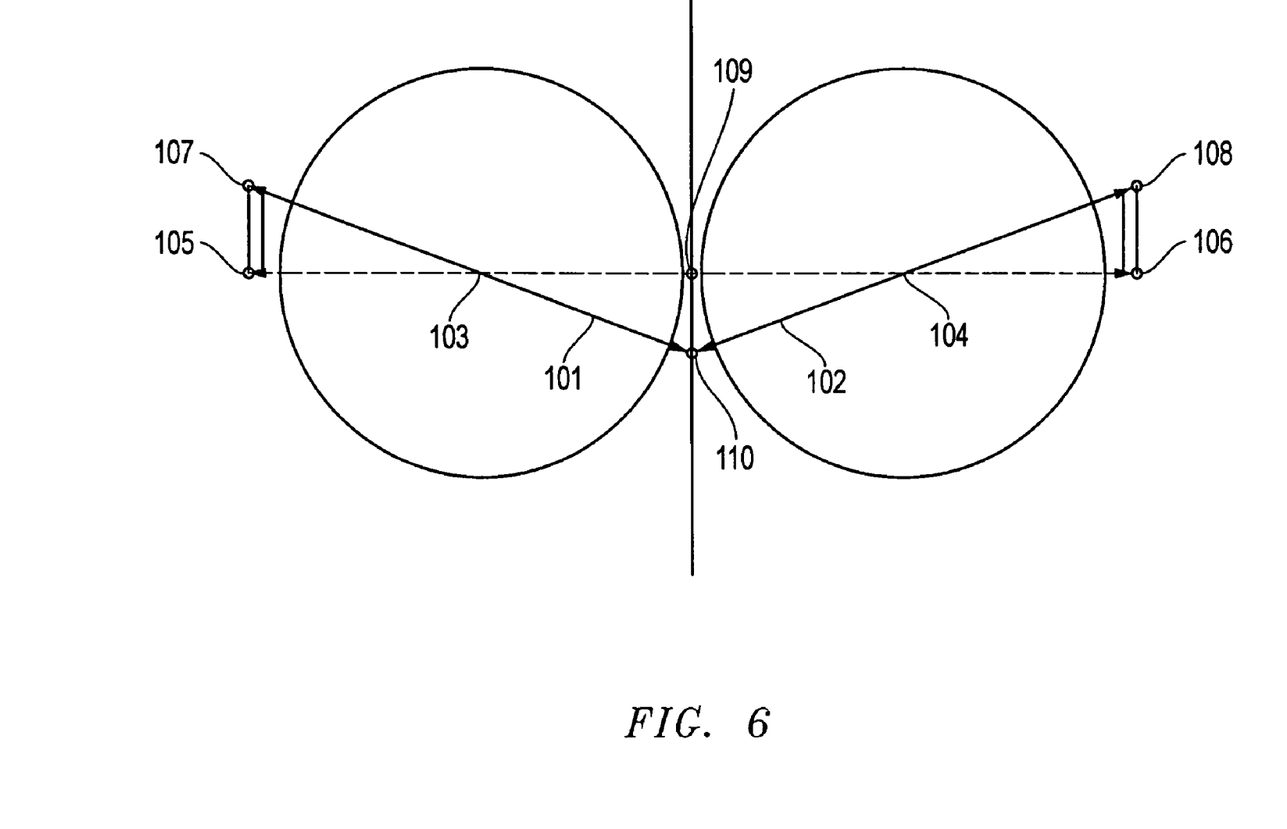
FIG. 6 is a plan view of the adjacent screens of the present invention in a split configuration.

FIG. 6 shows a plan view of the adjacent screens of the present invention in a split, or "open," configuration. In this configuration, the first screen 101 has been rotated around its center pole 103 so that the first screen 101 directly faces the first viewing area 201. Similarly, the second screen 102 has been rotated around its center pole 104 so that the second screen 102 directly faces the second viewing area 202. This configuration creates two separate and distinct screens onto which images may be displayed for viewing in two distinct viewing areas. In this embodiment of the invention, the screen in each viewing area is approximately 1000 pixels high by 2000 pixels wide with an aspect ratio of approximately 2:1. Once again, these dimensions are designed to take into account the formats of the films being shown by the theater as well as the dimensions of the theater itself and the physical location of the projection components, such as the projectors and the screens, however the dimensions are not meant to be limiting and may be any dimensions selected by the user of the invention.

Figure 7:
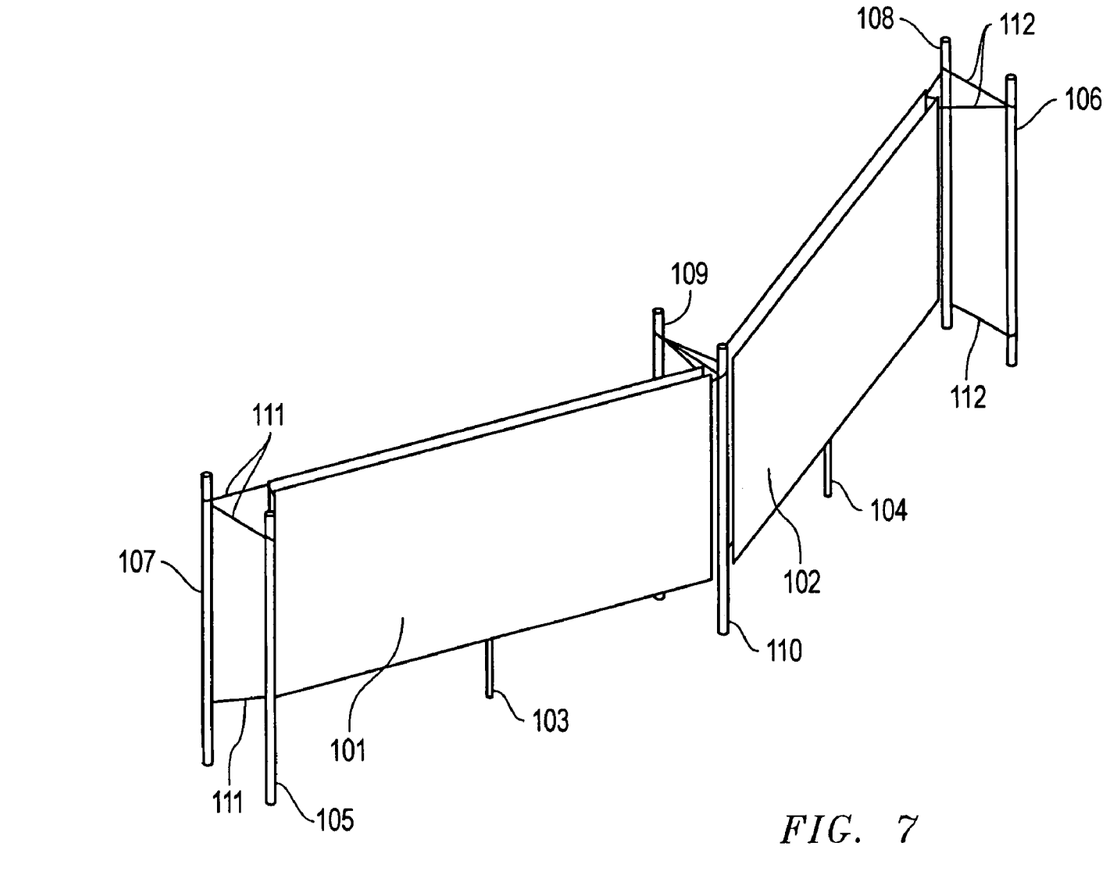
FIG. 7 is a perspective view of the adjacent screens of the present invention in a split configuration.

As can be seen in FIG. 7, once the screens have been arranged in their "open" configuration, the first screen 101 is affixed in its position by chaining or cabling the screen to side posts 107 and center post 110 and the second screen is affixed in its position by chaining or cabling the screen to side posts 108 and center post 110. The portion of the first screen 101 that is adjacent to the second screen 102, and the portion of the second screen 102 that is adjacent to the first screen 101, are similarly secured to the center pole 110. In one embodiment of the invention, the first screen 101 pivots around its center pole 103 and the second screen 102 pivots around its center pole 104.

As previously noted, although the two screens 101 and 102 are described as being pivoted around their respective center poles 103 and 104, movement of the screens may be accomplished through a number of other means. For example, in alternate embodiments of the invention, the two screens may be moved using electronic or manual wenches, pulleys or other devices and may be movable by using either wheeled platforms, tracks, or some combination thereof. In another embodiment, the screens may be mounted on rotating turntables or rotating stage floors.

Figure 8:
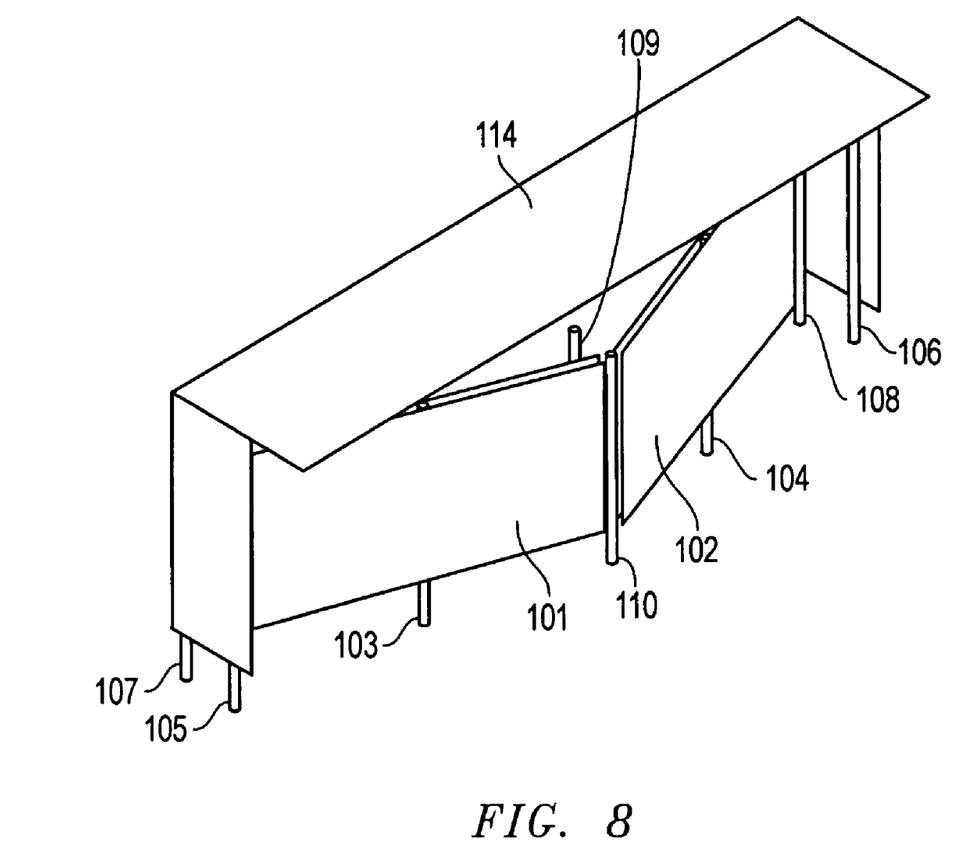
FIG. 8 is a perspective view of the adjacent screens of the present invention in a split configuration located within a weather-protecting shelter.

FIG. 8 shows a perspective view of the adjacent screens of the present invention in a split configuration located within a shelter 114. As previously described, the shelter 114 is configured to protect the first screen 101 and the second screen 102 from the wind, rain, light and other elements or environments which may be detrimental thereto.

Figure 9:
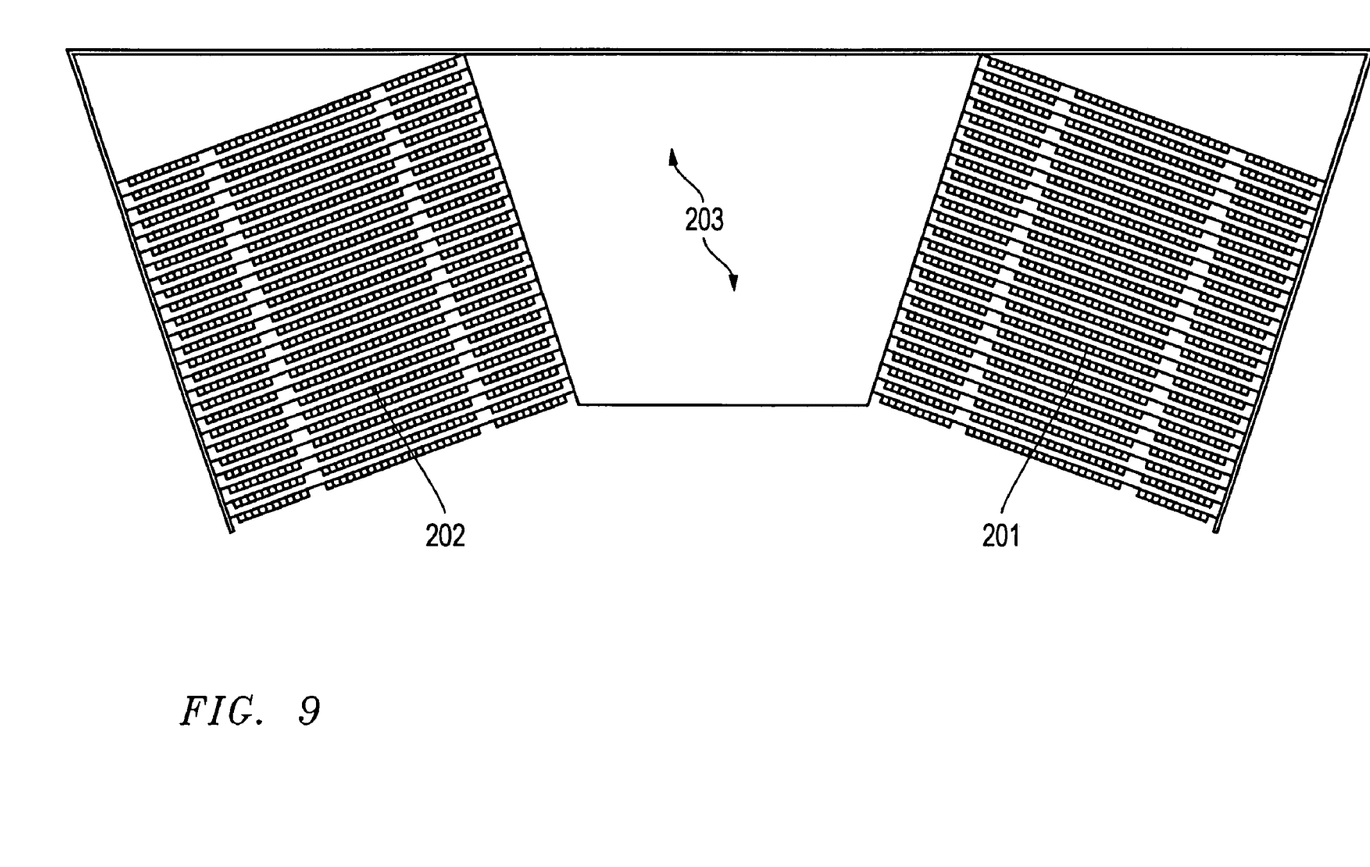
FIG. 9 is a plan view of the viewing areas of the present invention.
Figure 10:
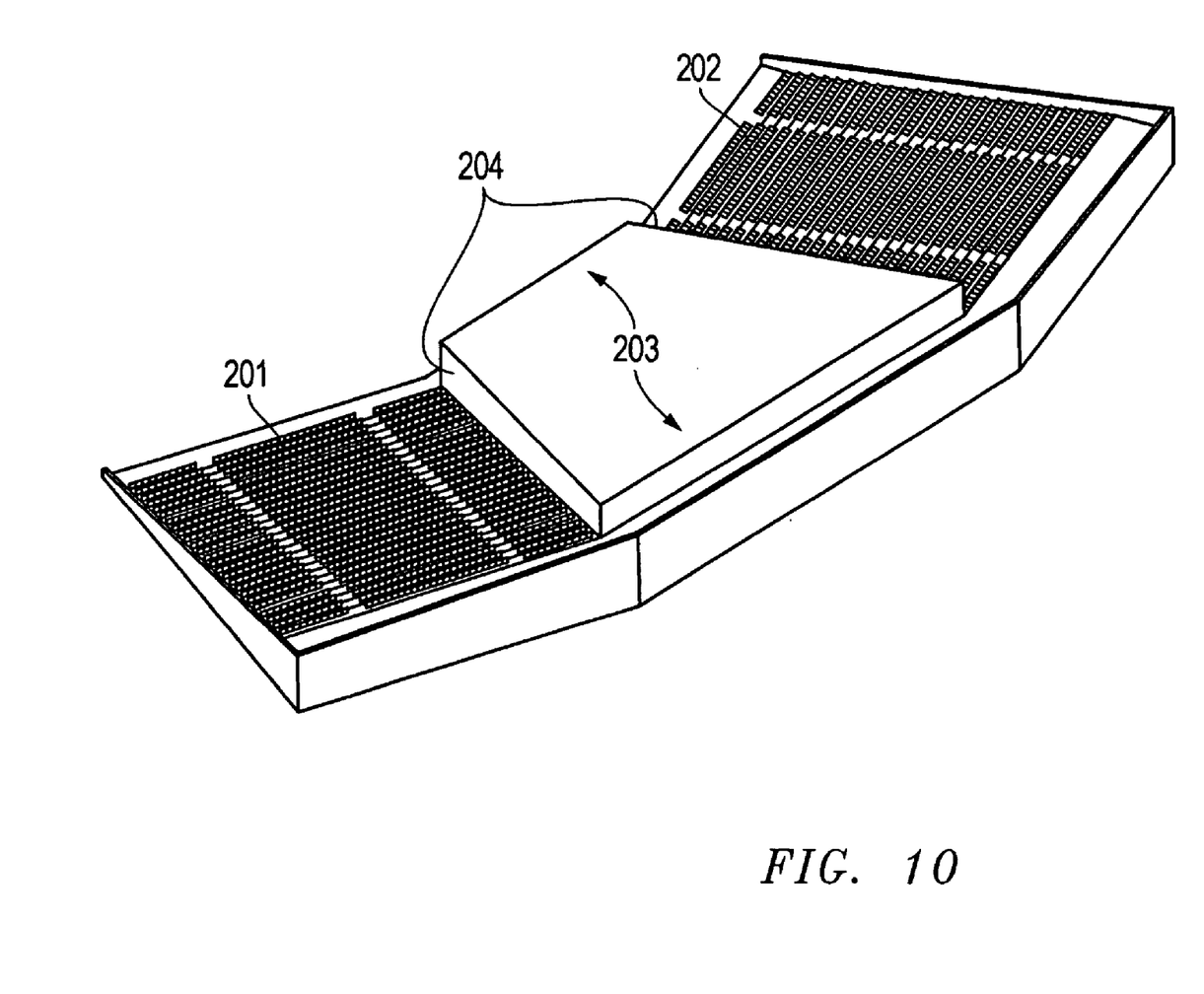
FIG. 10 is a top perspective of the viewing areas of the present invention.

FIGS. 9 and 10 show the viewing areas of the present invention. In this embodiment, the first viewing area 201 includes a plurality of seats for viewers of the images to be displayed on the first screen 101 and the second viewing area 202 includes a plurality of seats for viewers of the images to be displayed on the second screen 102. Although the seats are shown in "stadium" style, other configurations are also contemplated herein. When the screens are in the "open" configuration described above, viewers in the first viewing area 201 and viewers in the second viewing area 202 can each easily view and hear the content projected on their respective screen but viewers in the first viewing area 201 will not be able to hear or view the content on the second screen 102 and viewers in the second viewing area 202 will not be able to hear or view content on the first screen 101.

When the screens are in the "open" position, the berm 203 of the present invention serves both as a visual barrier and a sound attenuator. More specifically, the location and configuration of the berm 203 prevents viewers seated in the first viewing area 201 from seeing images projected onto the second screen 102. Similarly, the location and configuration of the berm 203 prevents viewers seated in the second viewing area 202 from seeing images projected on the first screen 101. With respect to sound, because high-frequency sound may be 'directed' and beamed towards two separate discreet audiences, it is possible to exhibit two different motion picture presentations side-by-side without sound from one presentation bleeding onto the sound being projected at the other presentation. The berm 203 blocks or deflects the sound that is directed toward viewers in the first viewing area 201 so that such sound does not infiltrate the second viewing area 202. Similarly, the berm 203 blocks or deflects the sound that is directed toward the viewers in the second seating area 202 so that it does not infiltrate the first viewing area 201. Because the berm provides an audio and visual barrier between the two adjacent theaters, it is possible to show two different sets of sound and images to viewers in the first viewing area 201 and viewers in the second viewing area 202 without concern for visual or audio interference between the respective viewers.

In addition to serving as an audio and visual barrier when the screens are in the "open" position, the berm 203 serves an important alternate function when the screens are in the "closed" position. When the two screens are in the "closed" position such that they form a single, continuous screen, viewers can assemble on top of the berm 203 to view the images projected on the screens. The berm 203 can be constructed in such a manner that it facilitates the ease of access for the viewers and provides them with a comfortable viewing area. In this configuration, viewers located on the berm would view one set of images on the two screens (configured in their "closed" position so as to create one unitary viewing surface) and receive one audio feed. Moreover, when the screens are in their "closed" position, there is no need for two sound tracks as one sound track can be shared by all of the audience viewing one single motion picture presentation.

The above description of illustrated embodiments of the invention is not intended to be exhaustive or to limit the invention to the precise forms disclosed. While specific embodiments of, and examples for, the invention are described herein for illustrative purposes, various equivalent modifications including those described above are possible within the scope of the invention, as those skilled in the relevant art will recognize. The teachings provided herein of the invention can be applied to other screen systems, not necessarily the illustrative dual-screen theater described above. The various embodiments above can be combined to provide further embodiments. In general, in the following claims, the terms used should not be construed to limit the invention to the specific embodiments disclosed in the specification and the claims, but should be construed to include all theaters or screen systems that operate under the claims to provide first and second screens, with one screen movable relative to the other screen. Accordingly, the invention is not limited by the disclosure, but instead the scope of the invention is to be determined entirely by the following claims, which are to be construed in accordance with established doctrines of claim interpretation.

What is claimed is:

1. A method of projecting video onto two adjacent screens, comprising:
    providing a first screen and a second screen wherein the viewable portion of one or both of said first screen and said second screen are approximately 1000 pixels high by 2000 pixels wide and wherein said first screen and said second screen have one operating position in which the front of said first screen and the front of said second screen are substantially aligned and a second operating position in which the front of said first screen and the front of said second screen are angled away from each other such that said first screen faces a first viewing area and said second screen faces a second viewing area;
    moving said first screen or said second screen from said first operating position to said second operating position; and
    projecting images upon one or both of said first screen and said second screen.

2. A method of projecting video onto two or more adjacent screens comprising:
    providing a first screen wherein said first screen is viewable from a first viewing area;
    providing a second screen wherein said second screen is adjacent to said first screen and is moveable relative to said first screen and wherein one or both of said first screen and said second screen have viewing areas that are approximately 1000 pixels high by 4000 pixels wider;
    moving said second screen from a first position in which the front of said first screen and the front of said second screen are substantially aligned to a second position in which the front of said first screen faces a first viewing area and the front of said second screen faces a second viewing area; and
    projecting images upon said first screen or said second screen.

* * * * *